(12) United States Patent
Smith et al.

(10) Patent No.: US 8,190,314 B2
(45) Date of Patent: May 29, 2012

(54) SYSTEM, METHOD, AND COMPUTER SOFTWARE CODE FOR LINKING A PLURALITY OF POWERED SYSTEMS HAVING DIFFERENT LINKING PROTOCOLS TO OPERATE AS A SINGLE POWERED SYSTEM

(75) Inventors: Eugene A. Smith, Satellite Beach, FL (US); Mark Wayne Wheeler, Palm Bay, FL (US); Lawrence R. Waldo, Palm Bay, FL (US); Rabi N. Ratnesar, Orlando, FL (US); James Kelley, West Melbourne, FL (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 12/327,018

(22) Filed: Dec. 3, 2008

(65) Prior Publication Data

US 2009/0292411 A1    Nov. 26, 2009

Related U.S. Application Data

(60) Provisional application No. 61/056,062, filed on May 26, 2008.

(51) Int. Cl.
*G05D 3/00* (2006.01)
*G06F 19/00* (2011.01)

(52) U.S. Cl. ............................................. 701/19; 701/99

(58) Field of Classification Search .................... 701/19, 701/99
See application file for complete search history.

(56) References Cited

U.S. PATENT DOCUMENTS

| | | | | |
|---|---|---|---|---|
| 4,788,657 | A * | 11/1988 | Douglas et al. | 710/104 |
| 5,586,117 | A | 12/1996 | Edem et al. | |
| 6,108,350 | A * | 8/2000 | Araujo et al. | 370/467 |
| 6,144,900 | A | 11/2000 | Ali et al. | |
| 6,322,025 | B1 | 11/2001 | Colbert et al. | |
| 6,668,319 | B1 | 12/2003 | Newell, Jr. et al. | |
| 6,675,196 | B1 * | 1/2004 | Kronz | 709/203 |
| 6,759,951 | B2 | 7/2004 | Kellner et al. | |
| 7,912,046 | B2 * | 3/2011 | Li et al. | 370/389 |
| 2003/0094546 | A1 * | 5/2003 | Kellner et al. | 246/167 R |
| 2008/0080436 | A1 * | 4/2008 | Sandhu et al. | 370/338 |
| 2009/0268703 | A1 * | 10/2009 | Furumi | 370/342 |
| 2009/0292411 | A1 * | 11/2009 | Smith et al. | 701/19 |

* cited by examiner

*Primary Examiner* — James Trammell
*Assistant Examiner* — Michael D Lang
(74) *Attorney, Agent, or Firm* — GE Global Patent Operation; John A. Kramer (57) ABSTRACT

A method for linking together three or more powered systems to operate as a single distributed power system, the method includes identifying a first linking protocol between at least a first powered system and a second powered system, determining whether at least a third powered system is compatible with the first linking protocol, if not compatible, switching to at least a second linking protocol to find a common linking protocol between the first powered system, the second powered system, and at least the third powered system, and linking the first powered system, the second powered system, and at least the third power system to operate in a distributed power configuration when the common linking protocol is found. A system and a computer software code linking together two or more powered systems to operate as a single distributed power system are also disclosed.

25 Claims, 6 Drawing Sheets

SYSTEM, METHOD, AND COMPUTER SOFTWARE CODE FOR LINKING A PLURALITY OF POWERED SYSTEMS HAVING DIFFERENT LINKING PROTOCOLS TO OPERATE AS A SINGLE POWERED SYSTEM

CROSS-REFERENCE TO RELATED APPLICATIONS

This application claims the benefit of U.S. Provisional Application No. 61/056,062 filed May 26, 2008, and incorporated herein by reference in its entirety.

BACKGROUND OF THE INVENTION

This invention relates generally to communication systems and, more particularly, to the distributed power control of two or more powered systems.

Trains are commonly used as an efficient means for hauling cargo and/or passengers over long distances. A typical train includes a plurality of non-powered rail cars and a plurality of locomotives for moving the non-powered rail cars over a track. Two or more locomotives grouped or otherwise controlled together for traction purposes are commonly referred to as a "consist." Distributed power control systems (hereinafter distributed power, or DP systems, or simply DP) allow for the operation of one or more remote locomotives (or group of locomotives forming a consist) in a train. The remote locomotive(s) are remotely controlled from a lead locomotive of the train by way of a radio or hard-wired communication system. Currently, DP systems operate with only a single version of DP software installed, identified by a version code. The version code is used during the linking process to ensure that only compatible locomotives with the same version code are linked and operated together. For example, a locomotive from Railroad "A" will have one type of software or a unique version code whereas a locomotive from Railroad "B" will have another software or a distinct version code. Since the two locomotives are different, the two types or versions of software are different and will not operate together.

When locomotives are upgraded to a newer or different version of DP software, a new version code is provided which in turn prohibits linking and/or operation with locomotives that have an older and/or a different version of DP software. Therefore, to provide for complete linkability, all locomotives must to have the same version of DP software. To have the same version of DP software available for all locomotives, upgrades to locomotives, which are typically linked together, would have to be completed at approximately the same time. Due to scheduling constraints, owners and operators of locomotives may have a limited timeframe to perform the upgrades.

Within the United States, DP control is provided using a Federal Communication Commission (FCC)-approved frequency allocated for railroad operations in the 450 MHz frequency range at power levels of about 30 watts. Similarly, for DP systems used in other countries, other frequency allocations and power levels have been provided. DP radio systems are capable of providing reliable and accurate locomotive control during conditions when the radio channel is free of interference. However, when interference is present, special communication techniques or radio message formats, such as unique locomotive identifiers and time randomization, have been developed to mitigate communication conflicts, such as may be encountered in situations where a large number of locomotives are operated within a relatively small geographical area. Examples of small geographical areas include, but are not limited to, a location within a train yard, industrial site, etc.

Providers of DP control systems currently have been able to rework DP control systems to support two different locomotive types so that they could operate together in the same train. A common message format for both different locomotive types has been further developed to ensure communication between two different locomotive types, or version codes. However, when an upgraded locomotive is placed in the same train as a locomotive of the same type which has not been upgraded, then the upgraded locomotive type must be able to operate in the non-reworked state using the original message format and version codes in order to allow the two locomotives to operate together in the same train. Also, when it is desirable to include additional locomotive types that must operate together in the same train, reworking existing DP control systems becomes cost prohibitive, since such changes require significant more time to accomplish establishing a workable linking scheme between three or more different types of DP control systems.

Owners and operators of locomotives that are linked in a DP train configuration would benefit from having a DP control system where more than two versions of DP software is workable with a specific DP train and where radio message formats are provided to insure communication between lead and remote locomotives, where the remote locomotives may include more than two locomotive types. Having such a DP control system would allow owners and operators to more effectively schedule upgrades, thus resulting in minimized downtime for a fleet of locomotives. Owners and operators will also recognize benefits by having a greater range of locomotive combinations to be used in a single DP train configuration. Likewise, since DP-type control systems may be used with other powered systems, owners and operators of other powered systems would also realize cost savings where a DP-type control system existed which could operate with various versions of DP-like software used on powered systems that are linked together to complete a mission.

BRIEF DESCRIPTION OF THE INVENTION

Embodiments of the present invention relate to a system, method, and a computer software code for linking together three (or more) powered systems to operate as a single distributed power system. In one aspect, the method includes identifying a first linking protocol between at least a first powered system and a second powered system. A determination is made whether at least a third powered system is compatible with the first linking protocol. If the third powered system is not compatible with the first linking protocol, the method further comprises switching to at least a second linking protocol to find a common linking protocol between the first powered system, the second powered system, and the at least third powered system. The first powered system, the second powered system, and at least the third power system are linked to operate in a distributed power configuration when the common linking protocol is found.

In another embodiment, the system comprises a determination device to identify a first linking protocol between three (or more) powered systems. The system further comprises a comparison device to determine whether the first linking protocol between the powered systems is compatible with each of the powered systems. The system further comprises a switching device to allow the powered systems to change to at least a second linking protocol when all the powered systems are not compatible with the first linking protocol.

In another embodiment, the computer software code is stored on a computer readable media and is executed with a processor. The computer software code has a computer software module for identifying a first linking protocol between at least a first powered system and a second powered system, when executed with the processor. A computer software module for determining whether at least a third powered system is compatible with the first linking protocol, when executed with the processor, is also provided. To handle instances where it is determined that the third powered system is not compatible with the first linking protocol, the computer software code further comprises a computer software module for switching to at least a second linking protocol to find a common linking protocol between the first powered system, the second powered system, and the at least third powered system, when executed with the processor. The computer software code further comprises a computer software module for linking the first powered system, the second powered system, and at least the third power system to operate in a distributed power configuration when the common linking protocol is found, when executed with the processor.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Though exemplary embodiments of the present invention are described with respect to rail vehicles or railway transportation systems, specifically trains and locomotives, exemplary embodiments of the invention are also applicable for other powered systems as well, such as but not limited to off-highway vehicles, marine vessels, stationary units, agricultural vehicles, and transport buses, where either multiple vehicles or vessels, and/or multiple engines, are operated together. With respect to railway, marine, transport vehicles, agricultural vehicles, or off-highway vehicles this may refer to the movement of any of these powered systems from a present location to a destination. In the case of stationary applications, such as but not limited to a stationary power generating station or network of power generating stations, operation may refer to an amount of wattage (e.g., MW/hr) or other parameter or requirement to be satisfied by the powered system.

More specifically, although locomotive distributed power (DP) control systems for a train are disclosed, DP control systems are applicable to other powered systems as well. In one example involving marine vessels, a plurality of tugs may be operating together where all are moving the same larger vessel, where each tug is linked in time to accomplish the mission of moving the larger vessel. In another example, a single marine vessel may have a plurality of engines where the engines are linked to ensure emission and/or fuel efficiency while completing the mission. Likewise, with respect to off-highway vehicles (OHV), these vehicles may operate as a fleet of vehicles that have a same mission to move earth, from location A to location B, where each OHV is linked in time to accomplish the mission. With respect to a stationary power generating station, a plurality of stations may be grouped together collectively generating power for a specific location and/or purpose. In another embodiment, a single station is provided, but with a plurality of generators making up the single station.

Whereas as disclosed herein exemplary embodiments of the invention are disclosed with respect to locomotives, such as having a plurality of locomotives operating together where all are moving the same larger load, where each locomotive is linked in time to accomplish the mission of moving the larger load. In another exemplary embodiment a locomotive, and the other powered systems disclosed herein, may have more than one powered system, or engine, where all engines are linked together to accomplish the mission.

Exemplary embodiments of the invention solve problems in the art by providing a system, method, and computer implemented method, such as a computer software code, for providing a distributed power control system where more than two powered systems having different distributed power linking protocols (such as but not limited to different software versions, version codes, and/or different communication formats) are linked together to accomplish a mission.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means, such as but not limited to computer software code and computer software modules, for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to provide a distributed power control system that operates to link together multiple powered systems having different linking protocols to operate as a single powered system. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules, or computer software modules, include routines, programs, objects, components, data structures, etc. that performs particular tasks or implement particular abstract data types. For example, the software programs, or computer software code, that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well. Therefore, though the term "software" is used herein, those skilled in the art will not construe the term "software" as limiting, but rather provide this term the full scope of meaning as disclosed herein, wherein software may also be defined as computer-readable instructions that are executed by a processor, or any other artificial tabulation device.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in a consist, or off-board in wayside or central offices where wireless communication is used.

In this document the term "locomotive consist" is used. As used herein, a locomotive consist may be described as having one or more locomotives in succession, connected together so as to provide motoring and/or braking capability. The locomotives are connected together where no train cars are in between the locomotives. The train can have more than one locomotive consist in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as involving successive locomotives, those skilled in the art will readily recognize that a consist group of locomotives may also be recognized as a consist even when at least a car separates the locomotives, such as when the locomotive consist is configured for distributed power operation, wherein throttle and braking commands are relayed from the lead locomotive to the remote trains by a radio link or physical cable. Towards this end, the term locomotive consist should be not be considered a limiting factor when discussing multiple locomotives within the same train.

The terms "harmonized" and "non-harmonized" are also used in this document in reference to locomotives. "Harmonized" is used to define whether a particular locomotive can switch to another DP software version or version code. A "non-harmonized" locomotive operates only with a single DP software version and/or version code. A harmonized locomotive may operate using at least two DP software version and/or version codes.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

During a distributed power train preparation and setup, an operator determines if each locomotive that is to be part of the distributed power ("DP") train is the same locomotive type, having the same DP software, version code, and/or if any of the locomotives have been upgraded to a modified DP software version. For simplicity, the term "version code" is used herein in reference to a type of DP software, software version, and/or version code. In an exemplary embodiment, when linking the locomotives, at both the lead locomotive and remote locomotives, the operator may enter a version code, such as but not limited to a 4-digit locomotive number, which is used for linking. The version code will have an additional code, such as but not limited to a fifth digit or parameter, that defines the locomotive type, DP software, and/or software version code that will be used during the linking process.

For example, the fifth digit could be blank or empty, which may be used to indicate operation with a locomotive that has unmodified DP software. Having a "1" in the fifth digit may indicate a first modified version of the DP software, or a specific locomotive. If other types of locomotives are also utilized, the fifth digit may be a "2", "3", etc. where the modified DP software version and/or version code is used based on the fifth digit identifier.

In an exemplary embodiment, during the linking sequence, the modified DP software will check the version code exchanged between lead and remote locomotives and automatically switch to the proper DP software and version code. Those skilled in the art will readily recognize that when the DP software program is modified, the previous version is preserved as well so that a switch between the different versions is possible.

Figure 1:
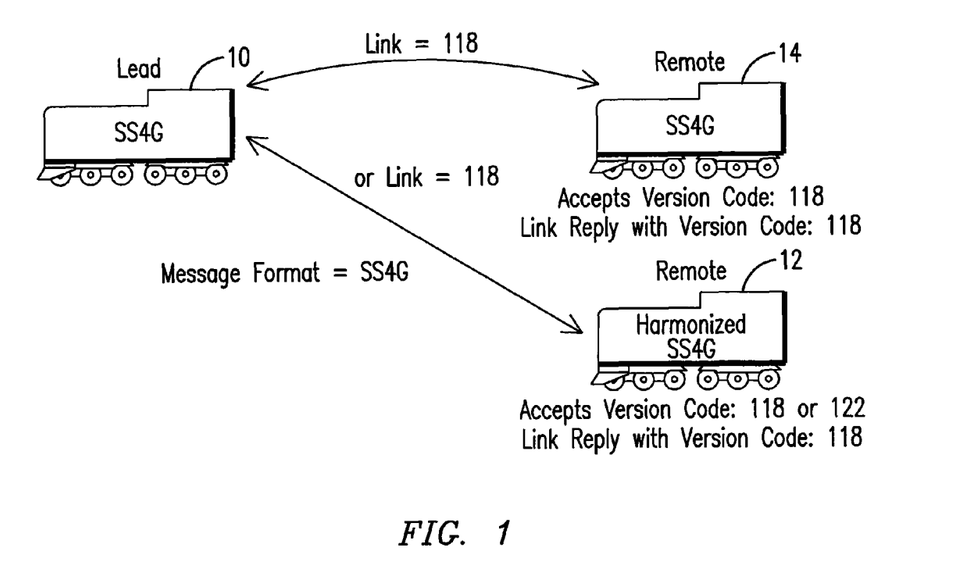
FIG. 1 depicts a block diagram illustrating an exemplary embodiment of a non-harmonized lead locomotive linking with a harmonized or a non-harmonized remote locomotive.

FIG. 1 depicts a block diagram illustrating an exemplary embodiment of a non-harmonized lead locomotive linking with remote locomotives. The non-harmonized lead locomotive 10 has a locomotive-specific version code or linking code, 118, and is non-harmonized. The version code may be an independent code, a locomotive type code, and/or a linking code used to identify the locomotive and/or a distributed power control system that is used with the non-harmonized lead locomotive 10. For a harmonized remote locomotive 12 with modified DP software, this locomotive 12 will accept link messages from its own locomotive-specific version with unmodified DP software and/or version code and also messages from a locomotive with modified DP software and/or version code. When a link message is received from the lead locomotive 10, the harmonized remote locomotive 12 will check the lead version code in the received message and automatically switch over to that version code and/or DP software and complete the linking process.

The non-harmonized lead locomotive 10 uses a version code in a message, such as 118, when communicating with remote locomotives during a linking attempt. As noted above, a non-harmonized remote locomotive 14 is one which operates with a single DP software type and/or version code. When a link message is sent to a non-harmonized remote locomotive 14, the non-harmonized remote locomotive 14 can only accept and reply to its own version code. Whereas, a harmonized remote locomotive 12, which is able to accept more than one linking code, such as 118 and 122, shall accept and respond if the non-harmonized lead's version code is compatible with any version of DP software aboard the harmonized remote locomotive 12. Its response however shall be with a link reply message that has the same version code, or linking code, as which was received from the non-harmonized lead locomotive, in this case 118.

Figure 2:
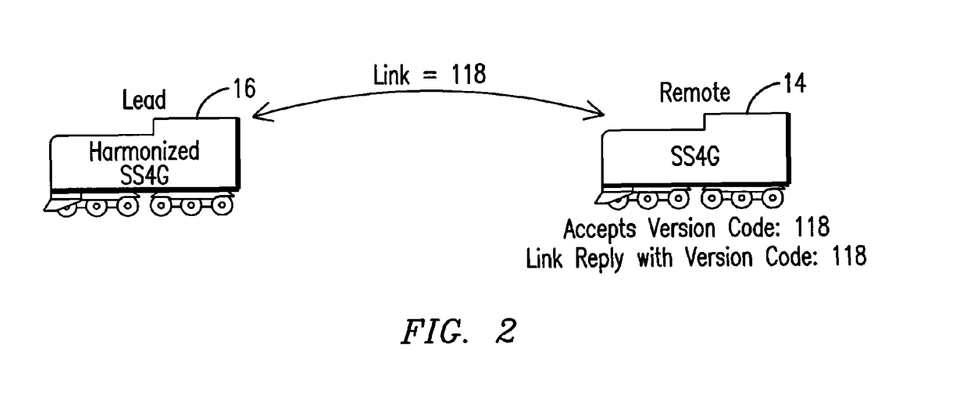
FIG. 2 depicts a block diagram illustrating an exemplary embodiment of a harmonized lead locomotive linking with a non-harmonized remote locomotive.
Figure 3:
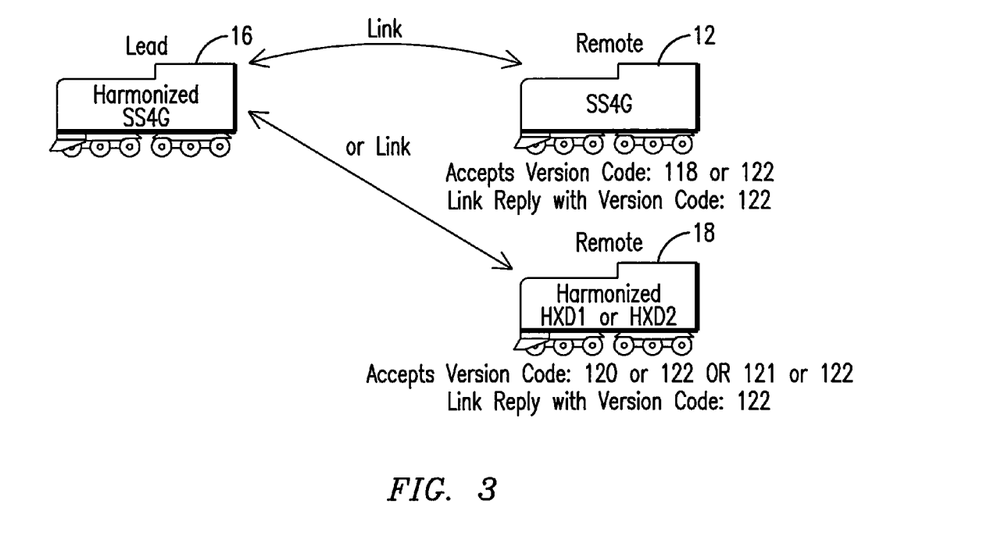
FIG. 3 depicts a block diagram illustrating an exemplary embodiment of a harmonized lead locomotive linking with harmonized remote locomotives.

FIGS. 2 and 3 depict block diagrams illustrating exemplary embodiments of a harmonized lead locomotive linking with remote locomotives. For the harmonized lead locomotive 16, when the linking sequence is initiated, the harmonized lead locomotive 16 will initially send a link message, such as 122, to the non-harmonized remote locomotive 14 using the modified DP software type and/or version code. If the non-harmonized remote locomotive 14 does not respond with the modified DP software version code, indicating that it did not receive the proper version code, then the lead locomotive 16 will automatically switch over to the unmodified DP software type and/or version code, 118, to link the remote locomotive using the unmodified DP software type and/or version code.

As illustrated in FIG. 3, being harmonized, the lead locomotive 16 may link to a first remote harmonized locomotive 18 with a first linking code 122, and then may have to sequence through other linking codes, such as 118, before linking with the first linking code 122. As disclosed with respect to FIG. 2, the switching between linking codes may be performed automatically until a common link is available between all locomotives 12, 16, 18.

Figure 4:
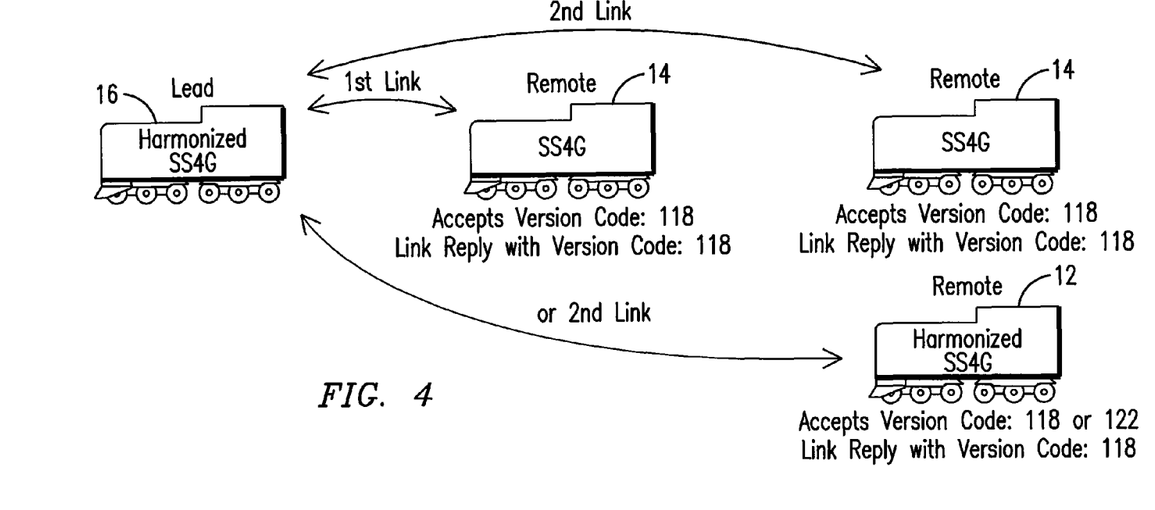
FIG. 4 depicts a block diagram illustrating an exemplary embodiment of a harmonized lead locomotive linking with both a harmonized remote locomotive and a non-harmonized remote locomotive.
Figure 5:
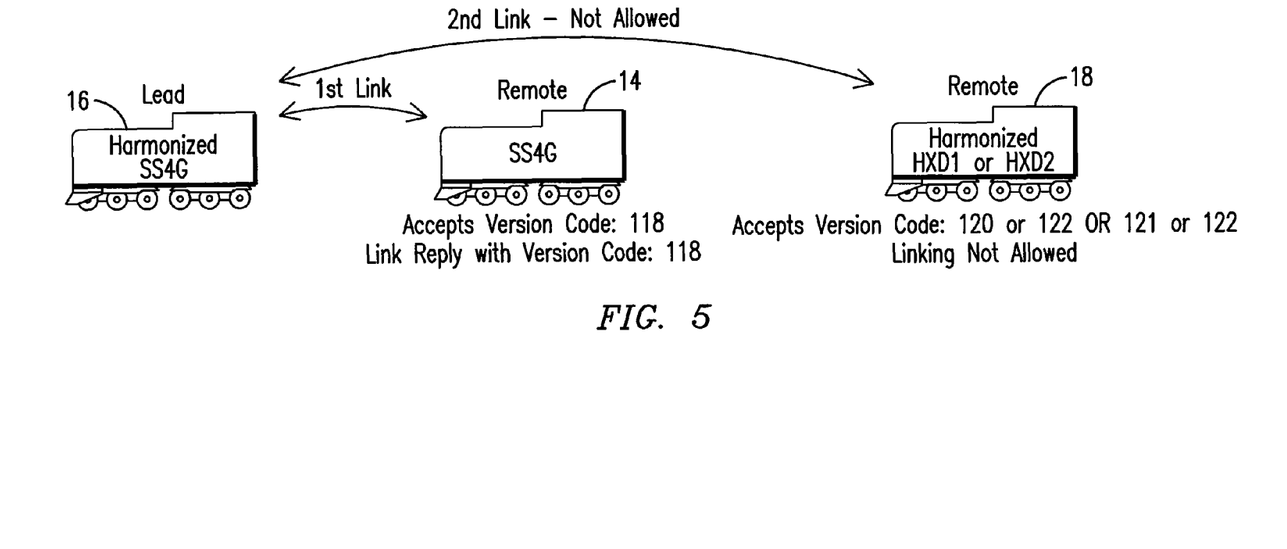
FIG. 5 depicts a block diagram illustrating an exemplary embodiment of a prohibition when a harmonized lead locomotive links with a harmonized remote locomotive and a non-harmonized remote locomotive.

FIGS. 4 and 5 depict block diagrams illustrating exemplary embodiments of a harmonized lead locomotive linking process. Once the harmonized lead locomotive has successfully liked to a non-harmonized remote locomotive 14, using the locomotive specific software version code, 118, the lead locomotive 16 shall only allow that locomotive-specific version code, 118, to be used for linking to additional remote locomotives. Therefore, if the harmonized remote locomotive 12 is to be linked, it must be linked using the same linking code, 118.

Figure 6:
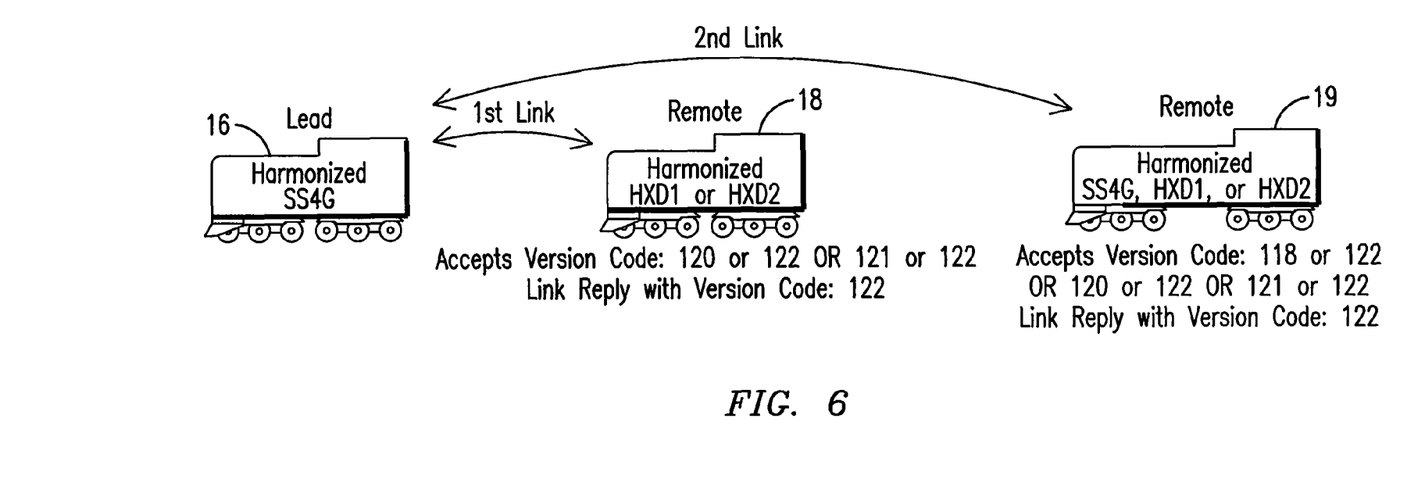
FIG. 6 depicts a block diagram illustrating an exemplary embodiment of another harmonized linking process.
Figure 7:
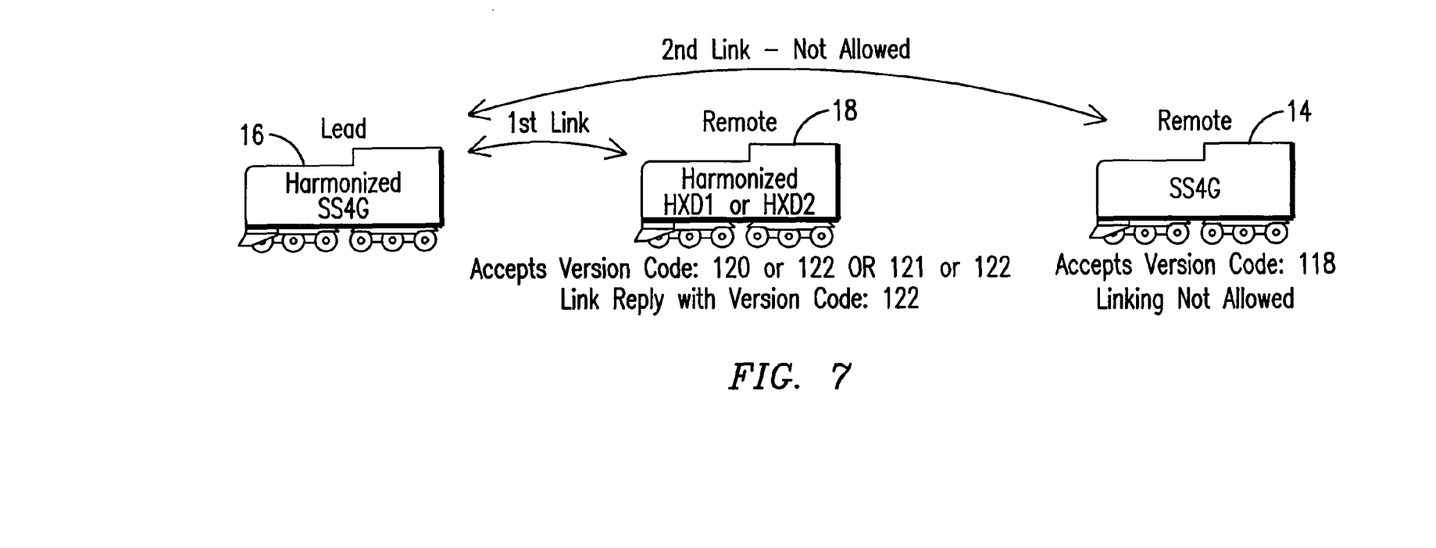
FIG. 7 depicts a block diagram illustrating an exemplary embodiment of another harmonized linking process.

Therefore, as further illustrated in FIG. 5, linking to other different locomotive types is not allowed. As disclosed, although the harmonized lead locomotive 16 and the non-harmonized remote locomotive 14 have a common linking code, 118, the second remote locomotive 18 does not possess the common linking code. In a similar fashion, as illustrated in FIGS. 6 and 7, once the harmonized lead locomotive 16 has successfully linked to the harmonized remote locomotive 18 of a different locomotive type using a harmonized version code, 122, the harmonized lead locomotive 16 shall only allow linking of other harmonized remote locomotives, which accept the same harmonized version code. Thus, as illustrated in FIG. 6, the harmonized lead locomotive 16 is able to link to the first harmonized remote locomotive 18 as well as a second harmonized remote locomotive 19, since at least one linking code, 122, is similar across all locomotives 16, 18, 19. But as illustrated in FIG. 7, linking to additional non-harmonized locomotive types or even harmonized locomotive types not having a common linking code is not permissible. Specifically, though the harmonized lead locomotive 16 is linked to the first harmonized remote locomotive 18, using linking code 122, linking with the second non-harmonized remote locomotive 14 is not permissible since the only acceptable linking code is 118.

Figure 8:
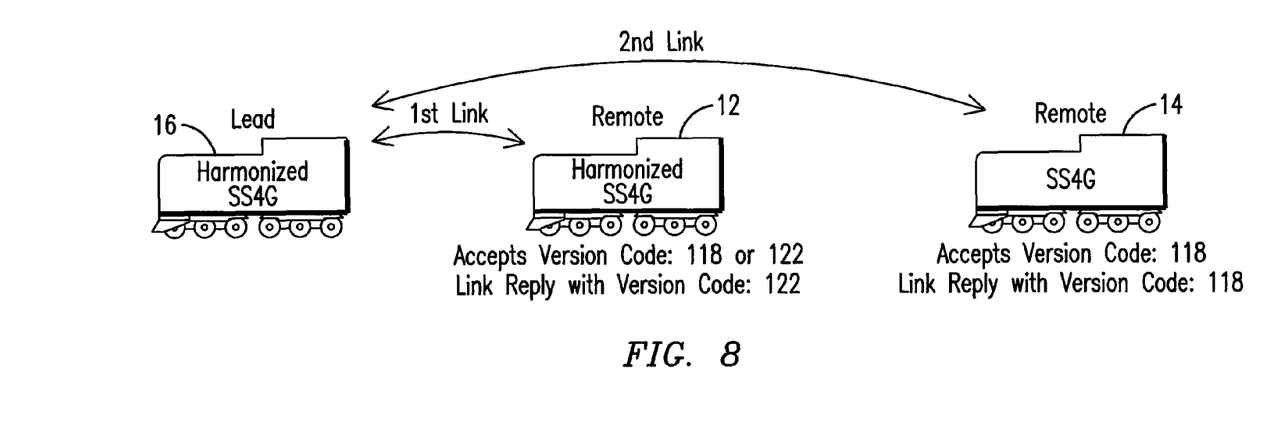
FIG. 8 depicts a block diagram illustrating an exemplary embodiment of a harmonized lead locomotive linking process.

FIG. 8 depicts other block diagrams illustrating exemplary embodiments of a harmonized lead locomotive linking process. Once the harmonized lead locomotive 16 has linked to the first harmonized remote locomotive 12 of the same locomotive type using the locomotive specific version code, 122, the harmonized lead locomotive 16 may allow linking to additional non-harmonized locomotives 14 of the same type as the lead locomotive 16. However, the harmonized lead locomotive 16 and the harmonized remote locomotive 12 will then be reconfigured such that they will now all operate with the locomotive-specific version code required by the non-harmonized remote locomotive 14. Also, once the harmonized lead locomotive 16 has linked to the harmonized remote locomotive 12 of the same locomotive type using the locomotive specific version code, 122, the lead locomotive 16 may allow linking to additional harmonized remote locomotives of a different locomotive type using the harmonized locomotive version code, 122, as is illustrated in FIG. 9.

Figure 9:
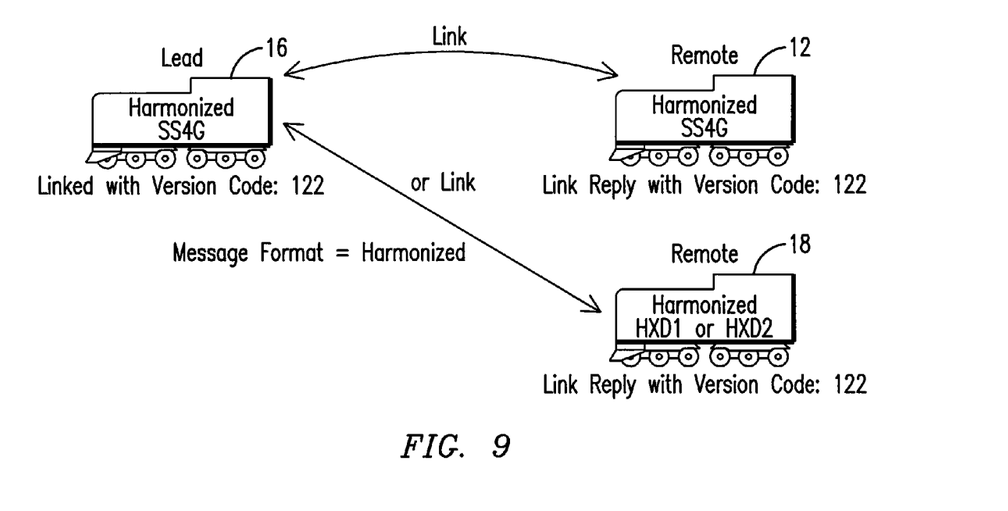
FIG. 9 depicts a block diagram illustrating an exemplary embodiment of when a harmonized communication message format is used.

FIG. 9 depicts a block diagram illustrating an exemplary embodiment of a communication message format. Radio message formats may vary depending on whether or not the lead locomotive 16 and/or the remote locomotives 12, 18 are harmonized. A radio message format is identified on each locomotive illustrated in FIGS. 1-10, specifically SS4G, HXD1, and HXD2. The message format illustrated in FIG. 9 is a harmonized format since each locomotive 12, 16, 18 are harmonized. If the lead locomotive 16 and the remote locomotives 12, 18 are all harmonized, then a harmonized message format is utilized. Specifically, a link and link reply radio message format defined in a harmonized radio message format is utilized. In the exemplary embodiment of FIG. 1, though, either the harmonized format may be used or the standard format, SS4G, since the standard format is common across all locomotives 12, 16, 14.

Referring back to FIG. 1, the message format used, SS4G, may be the locomotive-specific radio message format, since linking occurs with the same version code, 118. Similarly, the locomotive-specific radio message format, such as SS4G, is used when the harmonized lead locomotive 16 links only with the non-harmonized remote locomotive 14 with the same version code, 118.

Therefore, referring back to FIG. 8, since at least one remote locomotive 14 is not harmonized, even if the harmonized lead locomotive 16 links to the remote harmonized locomotive first, hence using a harmonized message format, the message format is reconfigured to the locomotive specific radio message format, SS4G, just like the linking code is reconfigured from 122 to 118.

Figure 10:
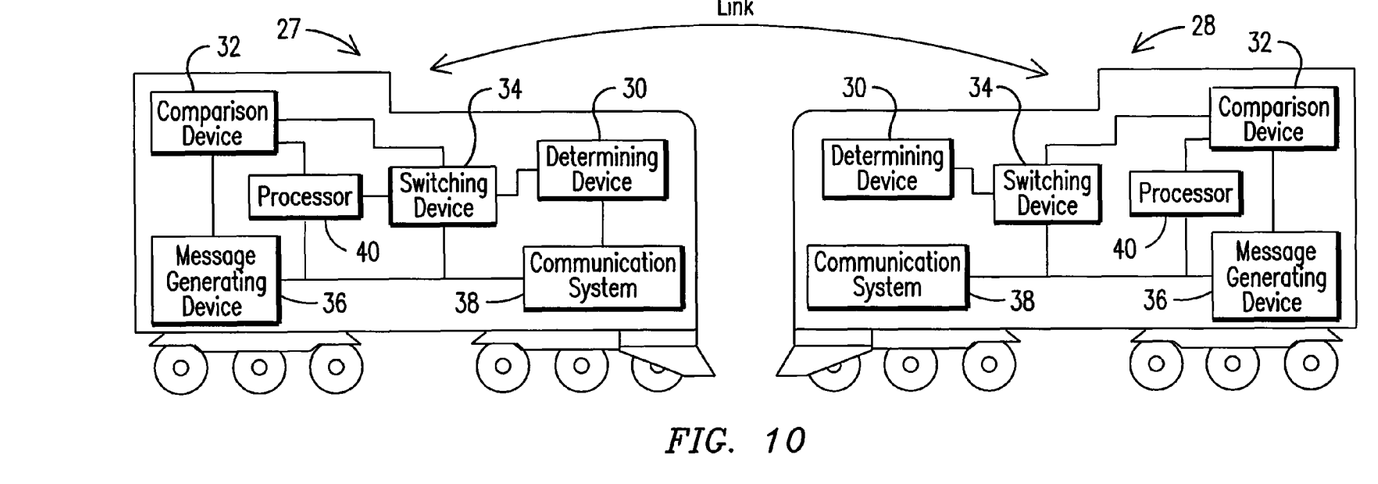
FIG. 10 depicts a block diagram illustrating an exemplary embodiment of elements that provide for multiple powered systems to operate as a single unit, such as when operating in a distributed power configuration.

FIG. 10 depicts a block diagram illustrating an exemplary embodiment of elements that provide for multiple powered systems (locomotives are illustrated) to operate as a single unit, such as when operating in a distributed power configuration. A determination/determining device 30 identifies a powered system type code (that is, the code reflects the type of powered system in question), linking code, and/or a version code on a lead powered system 27 and at least one remote powered system 28. The lead powered system 27 and the remote powered system 28 may be harmonized or non-harmonized. A comparison device 32 determines whether the powered system type code and/or the version code are compatible between the lead powered system 27 and the at least one remote powered system 28. A switching device 34 allows at least one of the lead powered system 27 and the at least one remote powered system 28 to switch to a second version code, or linking code. The lead powered system 27 and the at least one remote powered system 28 are linkable when at least one of the powered system type code, linking code, and/or version code and the second version code are compatible between the lead powered system 27 and the at least one remote powered system 28. A message generating device 36 is provided on each powered system 27, 28 to format messages transmitted between the powered systems 27, 28 in a format acceptable to all linked powered systems. A communication system 38 is also available on each powered system 27, 28 to transmit and receive messages. Those skilled in the art will readily recognize that the determination device 30, comparison device 32, switching device 34, and the message generating device 36 may be computer-readable instructions that when executed by a processor 40 causes the processor 40 to perform the functions disclosed above. Therefore each of the elements disclosed above may each have a processor as part of each device, or a single processor may be utilized.

Figure 11:
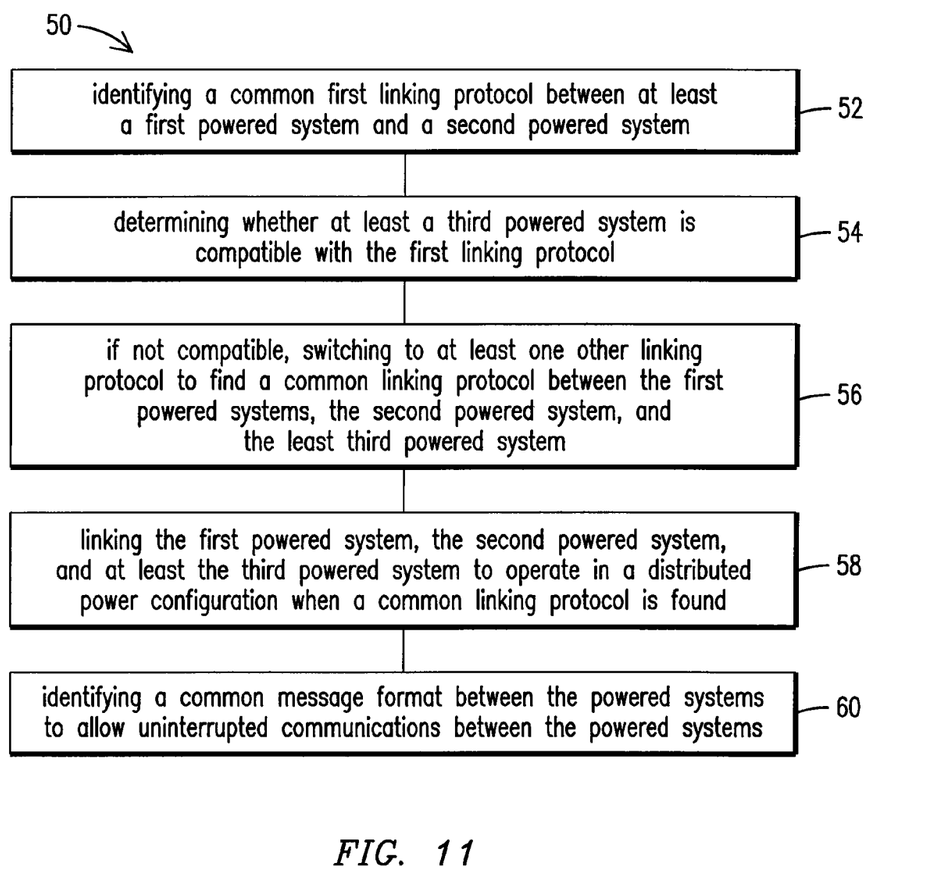
FIG. 11 depicts a flowchart illustrating a method for linking together more than two powered systems to operate as a single powered system.

FIG. 11 depicts a flowchart 50 illustrating an exemplary method for linking together more than two (i.e., three or more) powered systems (e.g., locomotives or locomotive consists) to operate as a single powered system (e.g., as part of a distributed power train), when the more than two locomotives (or other powered systems) have different types of distributed power software. As illustrated in the flowchart 50, the method comprises identifying a common first linking protocol between at least a first powered system and a second powered system, at 52. A determination is made whether at least a third powered system is compatible with the first linking protocol, at 54. If not compatible, the method continues at 56 by switching to at least one other linking protocol to find a common linking protocol between the first powered system, the second powered system, and the at least third powered system. When a common linking protocol is found, the first powered system, the second powered system, and at least the third power system are linked to operate in a distributed power configuration, at 58. A common message format between the powered systems, to allow uninterrupted communications between the powered systems, is identified and used, at 60. Those skilled in the art will readily recognize that "uninterrupted communications" refers to having a common message format that allows the powered systems to communicate between one another without having to reestablish communications or reformat messages due to different linking protocols. The method shown in flowchart 50 may be utilized with a computer software code operable within a processor and storable on a computer readable media where each element of the method is implemented with a computer software module.

While the invention has been described herein with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc., do not denote any order or importance, but rather the terms first, second, etc., are used to distinguish one element from another.

What is claimed is:

1. A method comprising:
   identifying a first linking protocol between at least a first powered system and a second powered system that are mechanically linked together in a single distributed power system;
   determining whether a third powered system of the single power system is compatible with the first linking protocol;
   switching to at least a second linking protocol to find a common linking protocol between the first powered system, the second powered system, and the third powered system if the third powered system is incompatible with the first linking protocol; and
   linking the first powered system, the second powered system, and the third power system to operate in a distributed power configuration of the single power system when switched to the common linking protocol.

2. The method according to claim 1, further comprising identifying a common message format between the first powered system, the second powered system, and the third powered system to allow uninterrupted communications between the first powered system, the second powered system, and the third powered system.

3. The method according to claim 1, wherein the common linking protocol comprises at least one of a powered system type code, a version code, or a linking code used to identify at least one of each powered system in the single power system or a distributed power control system of each powered system.

4. The method according to claim 1, wherein the first powered system, the second powered system, and comprise at least one of a railway system, a marine vessel, an off-highway vehicle, a stationary system, a transportation vehicle, or an agricultural vehicle.

5. A system comprising:
   a determination device to identify a first linking protocol between the three or more powered systems of a single power system;
   a comparison device to determine whether the first linking protocol between the three or more powered systems is compatible with each powered system of the three or more powered systems; and
   a switching device to allow one or more of the three or more powered systems to change to at least a second linking protocol when one or more of the three or more powered systems are not compatible with the first linking protocol.

6. The system according to claim 5, wherein at least one of the first linking protocol or the at least the second linking protocol comprise one or more of a powered system type code, a version code, or a linking code used to identify at least one of each of the powered systems or a distributed power control system of each of the powered systems.

7. The system according to claim 5, further comprising a message generating device configured to be included as part of each of the three or more powered systems to format a message transmitted between the three or more powered systems in a format that is acceptable to each of the three or more powered systems.

8. The system according to claim 7, further comprising a communication system to communicate the message.

9. The system according to claim 7, wherein at least one of the determination device, the comparison device, the switching device, or the message generating device further comprise a processor.

10. The system according to claim 9, further comprising computer-readable instructions that cause the processor to function as one or more of the determination device, the comparison device, or the switching device when the computer-readable instructions are executed by the processor.

11. The system according to claim 5, wherein the three or more powered systems comprise at least one of a railway system, a marine vessel, an off-highway vehicle, a stationary system, a transportation vehicle, or an agricultural vehicle.

12. A computer software code stored on a computer readable media and configured for execution with a processor, the computer software code comprising one or more computer software modules configured to direct the processor to:
identify a first linking protocol between at least a first powered system and a second powered system of a single power system;
determine whether a third powered system is compatible with the first linking protocol;
switch to at least a second linking protocol to find a common linking protocol between the first powered system, the second powered system, and the third powered system if the third powered system is not compatible with the first linking protocol; and
link the first powered system, the second powered system, and the third power system to operate in a distributed power configuration of the single power system using the common linking protocol.

13. The computer software code according to claim 12, wherein the one or more computer software modules are configured to direct the processor to identify a common message format between the first powered system, the second powered system, and the third powered system to allow uninterrupted communications between first powered system, the second powered system, and the third powered system.

14. The computer software code according to claim 12, wherein the common linking protocol comprises at least one of a powered system type code, version code, or a linking code used to identify at least one of: each of the first powered system, the second powered system, and the third powered system or a distributed power control system of the first powered system, the second powered system, and the third powered system.

15. The computer software code according to claim 12, wherein the first powered system, the second powered system, and the third powered system comprise at least one of a railway system, a marine vessel, an off-highway vehicle, a stationary system, a transportation vehicle, or an agricultural vehicle.

16. The method according to claim 1, wherein the third powered system is not compatible with the first linking protocol when the third powered system uses a different linking protocol to communicate with other powered systems.

17. The method according to claim 1, wherein one or more of the first powered system, the second powered system, or the third powered system are configured to communicate with one or more other powered systems using a plurality of linking protocols that include the first linking protocol and the at least the second linking protocol.

18. The method according to claim 17, wherein switching to the at least the second linking protocol includes sequentially switching between each of the linking protocols in the plurality of linking protocols until the common linking protocol is identified.

19. The system according to claim 5, wherein the first linking protocol is not compatible with one or more of the three or more powered systems when at least one of the three or more powered systems uses a different linking protocol to communicate with other powered systems.

20. The system according to claim 5, wherein at least one of the three or more powered systems is configured to communicate with one or more other powered systems using a plurality of linking protocols that include the first linking protocol and the at least the second linking protocol.

21. The system according to claim 20, wherein the switching device is configured to sequentially switch between each of the linking protocols in the plurality of linking protocols until a common linking protocol that is compatible with each of the three or more powered systems is identified.

22. The computer software code according to claim 12, wherein the third powered system is not compatible with the first linking protocol when the third powered system uses a different linking protocol to communicate with other powered systems.

23. The computer software code according to claim 12, wherein one or more of the first powered system, the second powered system, or the third powered system are configured to communicate with one or more other powered systems using a plurality of linking protocols that include the first linking protocol and the at least the second linking protocol.

24. The computer software code according to claim 23, wherein the one or more computer software modules are configured to direct the processor to sequentially switch between each of the linking protocols in the plurality of linking protocols until the common linking protocol is identified.

25. A system comprising:
a determination device to identify a first linking protocol between three or more locomotives of a train;
a comparison device to determine whether the first linking protocol between the three or more locomotives is compatible with each locomotive of the train; and
a switching device to allow one or more of the three or more locomotives to change to at least a second linking protocol when one or more of the three or more locomotives are not compatible with the first linking protocol.

* * * * *